Figures 4, 5:
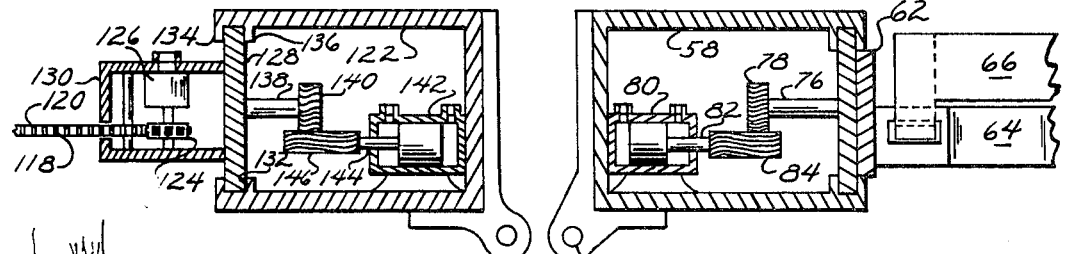

June 25, 1968     A. J. GALIS     3,389,728

TREE HARVESTER MACHINE

Filed March 7, 1966     2 Sheets-Sheet 1

INVENTOR.
ALEX J. GALIS

INVENTOR.
ALEX J GALIS

United States Patent Office 3,389,728
Patented June 25, 1968

3,389,728
TREE HARVESTER MACHINE
Alex J. Galis, Box 480, Rte. 3, Albany, Ga. 31701
Filed Mar. 7, 1966, Ser. No. 532,403
10 Claims. (Cl. 144—34)

This invention relates to machines employed in the harvesting of standing timber, which machines are referred to herein as tree harvester machines. In particular, this invention concerns a tree harvester machine having both tree holding and transporting means and tree cutting means that are operable individually and simultaneously in cooperation with each other.

The procedure of harvesting standing timber involves such operations as topping a standing tree, delimbing the tree, felling the tree, cutting the felled tree into shorter lengths of desired size and stacking or loading the short lengths of timber on storage or conveyor means. It is well recognized that tree harvesting becomes more efficient as more of the above individual operations are performed by machines. A further improvement in the efficiency of tree harvesting is realized when more than one of the separate operations involved can be performed by a single machine. Consequently, there have been described and manufactured hitherto a number of machines for use in tree harvesting which are capable of performing more than one of the individual operations involved. For example, there are machines capable of grasping a felled tree, feeding the tree to a cutting means, cutting the tree into short lengths, and loading the short lengths onto a receptacle or conveyor means. There are also tree loading machines capable of grasping and loading whole trees or short lengths of trees and which are flexible to the extent that they are capable of grasping wood virtually in any position and transferring such wood to virtually any other desired position.

A machine adapted for use in tree harvesting which is among the machines most pertinent to the concept of the invention described herein comprises a combination of tree shears and a tree clamp slidable along a substantially vertical track, with the track mounted on a mobile carriage. Apparently, such a machine is positioned adjacent a standing tree to be harvested, with the track assembly positioned adjacent the tree in a plane substantially parallel to the plane of the longitudinal axis of the tree. That machine has tree shears rigidly connected below the bottom of the rails for shearing the trunk of the tree near the ground while the tree is held by the tree clamp. The tree clamp is slidable along the rails and is adapted for delimbing the tree as the clamp is moved up and down the rails.

A second type of available tree harvester has one cutting device mounted at the side thereof for shearing a trunk of a tree at the ground. That machine includes a tree loader that secures the felled tree, delimbs it, and feeds the felled tree to a second cutting device which cuts the tree into shorter lengths and permits the shorter lengths to drop into a conveyor means located below the second cutting device.

It is an object of this invention to provide a tree harvester machine having independently constructed and arranged thereon tree holding means and tree cutting means which are operable separately or in combination for felling, delimbing, cutting into short lengths, and loading.

Another object of this invention is the provision of a tree harvester machine capable of felling a tree by shearing the tree at ground level and thereafter lifting and holding the tree for topping, delimbing, cutting into short lengths, and loading.

An additional object of the present invention is the provision of a tree harvester machine capable of topping and delimbing a standing tree, cutting the tree into shorter lengths from the top down, and loading the short sections onto storage or conveyor means that can be associated with the tree harvester machine.

Still another object of this invention is the provision of a tree harvester machine having separate tree holding means and separate tree cutting means each revolvably mounted on the machine for operation separately or in cooperation with each other in the tree harvesting procedure.

Another object of this invention is the provision of a tree harvester machine having adjustable and extensible tree holding means revolvably mounted on the machine and capable of holding and transporting trees and parts of trees in many positions about the machine without repositioning the machine.

A further object of this invention is the provision of a tree harvester machine having adjustable and extensible tree cutting means revolvably mounted on the machine and capable of cutting a tree or tree member in many positions about the machine without repositioning the machine.

An additional object of this invention is the provision of a tree harvester machine having adjustable and extensible tree holding means revolvably mounted on the machine and adjustable and extensible tree cutting means revolvably mounted on the machine and separate from the tree holding means, with the tree holding means and tree cutting means operable separately or in cooperation with each other for the performance of the tree harvesting procedure.

Other objects of this invention will become apparent in light of the following discussion and accompanying drawings.

Figure 1:
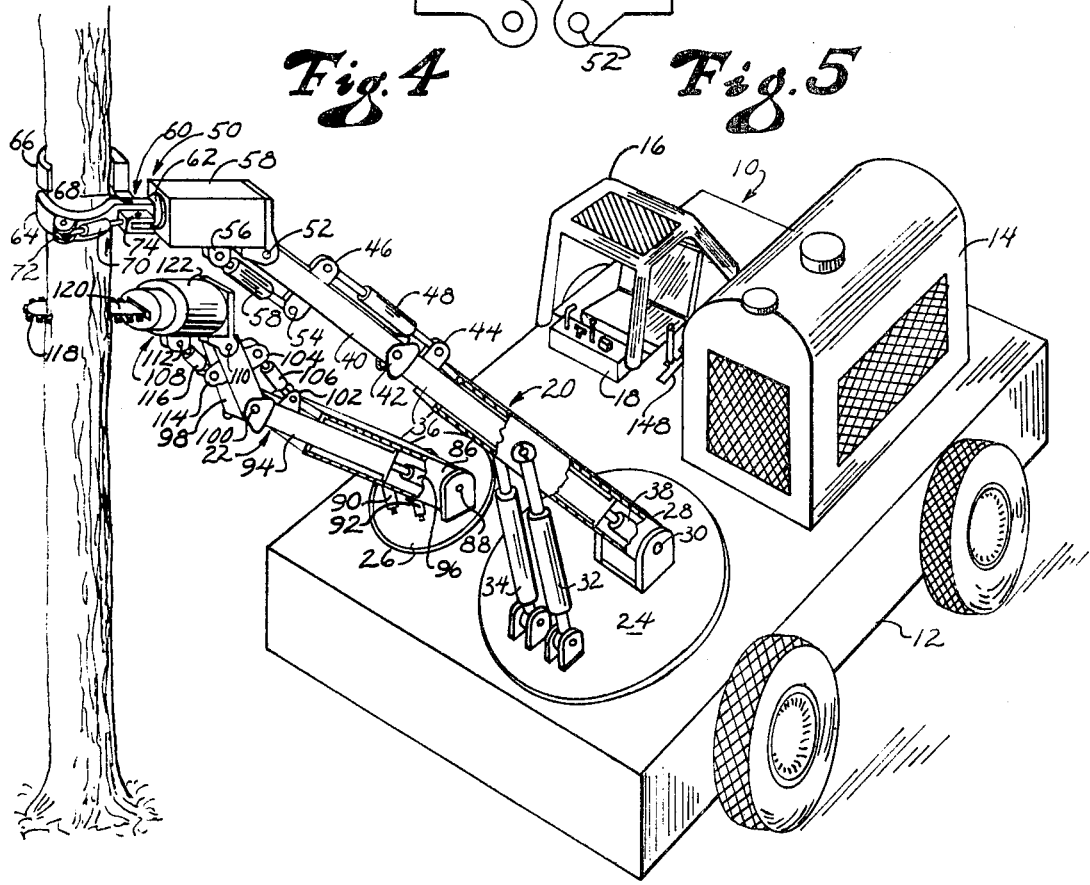
Figure 2:
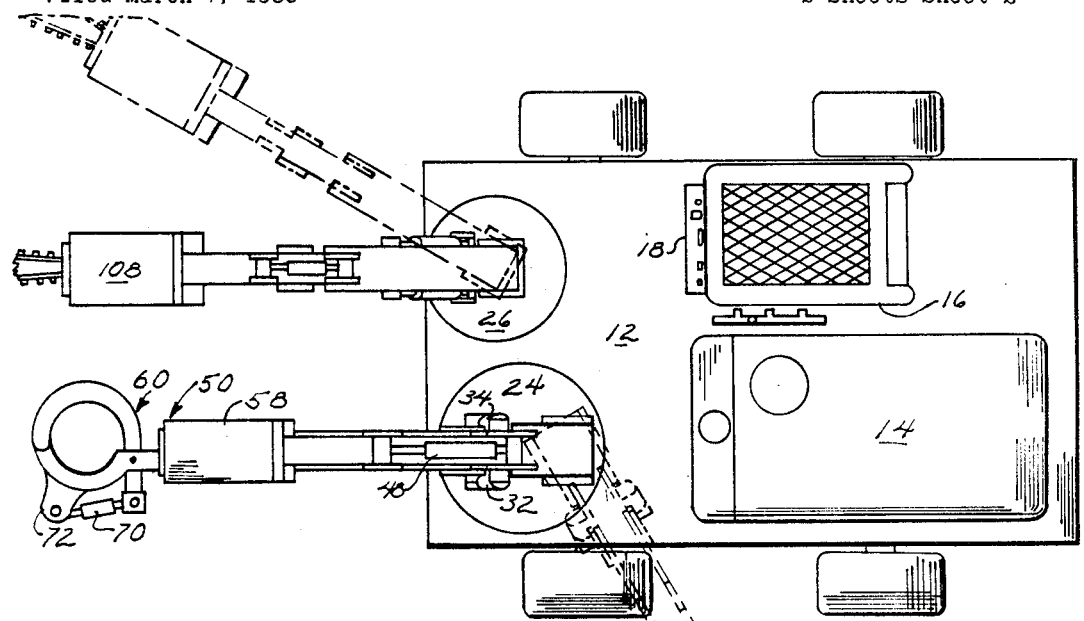
Figure 3:
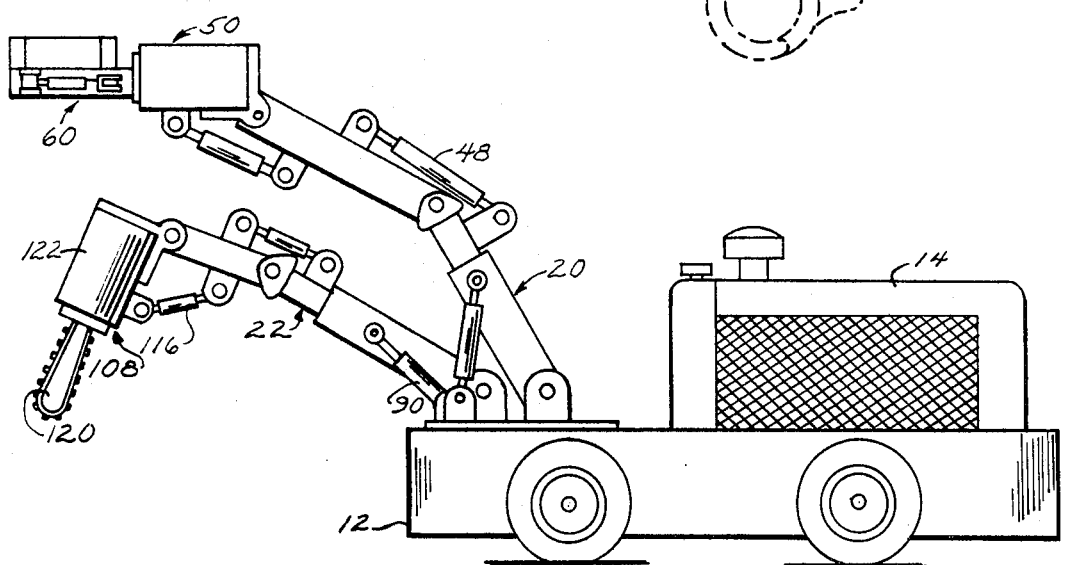

In the drawings:
FIGURE 1 is an isometric top plan view, partially fragmented and partially in section, of an embodiment of a tree harvester machine comprising the subject matter of this invention.
FIGURE 2 is a top plan view of the apparatus shown in FIGURE 1 and showing some of the different positions and orientations that can be occupied by the extensible and revolvable tree cutting means and tree holding means of the tree harvester machine of this invention.
FIGURE 3 is a side elevation of the tree harvester machine shown in FIGURE 1 and illustrates some of the various positions and orientations which can be assumed by the extensible and revolvable tree cutting means and tree holding means of this invention.
FIGURE 4 is a side elevation, in cross section, of the cutter assembly of the tree cutting means of the tree harvester machine shown in FIGURE 1.
FIGURE 5 is a side elevation in cross section of the clamp assembly of the tree holding means of the tree harvester machine shown in FIGURE 1.

As broadly described, this invention comprises, a tree harvester machine comprising support means, adjustable tree holding means revolvably mounted on the support means, adjustable tree cutting means separate from the tree holding means and revolvably mounted on the support means and means for actuating each of the tree holding means and the tree cutting means either independently or cooperatively with each other. In a preferred form of this invention, each of the tree holding means and the tree cutting means includes an extensible support member consisting of a plurality of separate sections, at least some of which are capable of being raised and lowered in a plane vertical to the support means. In another preferred embodiment of the apparatus of this invention, the tree holding means comprises a tree clamp which can be raised and lowered in a plane vertical to the support means and which can be revolved about an axis of revolution extending through the tree clamp. In an additional preferred embodiment of the apparatus of this invention, the tree cutting means comprises a tree cutter assembly capable of being raised and lowered in a plane vertical to the support means and revolvable about an axis of revolution passing through the cutter assembly. Another preferred embodiment of the apparatus of this invention includes control means mounted on the support means and constructed and arranged for the independent or cooperative manipulation and operation of the tree holding means and tree cutting means. In an additional preferred embodiment of the apparatus of this inventton, the support means is mobile or comprises a self-propelled wheeled carriage.

In the drawings, and in particular with reference to FIGURES 1, 2 and 3 there is shown a tree harvester machine, indicated generally by reference numeral 10, comprising a wheeled carriage 12 having mounted thereon drive means such as a motor 14 and means for carrying a human operator such as cab 16 containing control means 18. Tree holding means indicated generally by numeral 20, and tree cutting means, indicated generally by reference numeral 22, are each revolvably mounted on carriage 12 by means of their respective turntables 24 and 26.

Tree holding means 20 comprises a lower holding boom 28 having its lower end pivotally connected at 30 to turntable 24. Means for raising and lowering lower boom 28 about pivotal connection 30 in a plane vertical to carriage 12 comprise a pair of holding boom lifting jacks 32 and 34, each having its other end pivotally connected to lower holding boom 28.

Middle holding boom 36 is slidably secured within lower holding boom 28. Movement of middle holding boom 36 longitudinally of lower holding boom 28 is effected by a holding boom slide jack 38 mounted within the lower end of lower holding boom 28 and operatively connected to middle holding boom 36.

An upper holding boom 40 has its lower end pivotally connected at 42 to the upper end of middle holding boom 36 with the pivotal connection 42 constructed and arranged for vertical movement of upper holding boom 40 in a plane vertical to carriage 12. A pair of spaced parallel ears 44 extend upwardly from middle holding boom 36. Another pair of spaced parallel ears 46 extend upwardly from upper holding boom 40 in alignment with ears 44 on middle holding boom 36. A holding boom bending jack 48 is pivotally connected at its ends to ears 44 and ears 46 for raising and lowering upper holding boom 40 about pivotal connection 42 in a plane vertical to carriage 12.

A tree clamp assembly, indicated generally by reference numeral 50, is pivotally mounted at 52 to the end of upper holding boom 40 remote from middle holding boom 36. A pair of spaced parallel ears 54 extend downwardly from upper holding boom 40. Another pair of spaced parallel ears 56 extend downwardly from clamp assembly 50 in alignment with ears 54 on upper holding boom 40. A holding boom swing jack 58 is pivotally connected at its ends to ears 54 and ears 56 and can be actuated to raise and lower clamp assembly 50 about its pivotal connection 52 in a plane vertical to carriage 12.

Clamp assembly 50 comprises a housing 58 and a clamp, indicated generally by reference numeral 60, revolvably secured through face plate 62 to housing 58. Clamp 60 comprises a pair of opposing jaws 64 and 66 vertically spaced from each other and pivotally connected to each other by a pin at 68. A clamp jack 70 has an end pivotally connected at 72 to the outer surface of jaw 64 of clamp 60, and the other end of clamp jack 70 is pivotally connected at 74 to the rear end of jaw 66 of clamp 60. Clamp jack 70 can be actuated to rotate jaw 66 about pivotal connection 68 thereby moving jaw 66 toward and away from jaw 64. If desired, the inner surfaces of jaws 64 and 66 can be provided with serrations or other suitable means to provide more secure engagement between jaws 64 and 66 and the surface of the tree engaged thereby. In addition, the inner surfaces of jaws 64 and 66 can, if desired, be provided with a covering of resilient or other protective material adapted to protect the surfaces of the tree engaged by jaws 64 and 66.

The apparatus of the invention described herein includes means for revolving clamp 60 about an axis of revolution passing through the connection between clamp 60 and housing 58 of clamp assembly 50. The structural details of suitable revolving means are illustrated in FIGURE 5 which shows a shaft 76 connected to the rear end of jaw 64 by suitable means such as a circular plate attached to face plate 62 and revolvable between spaced parallel flanges extending inwardly from the wall of housing 58. Shaft 76 extends into the interior of housing 58 and a spiral toothed clamp gear 78 is rigidly mounted on shaft 76 within housing 58. A clamp turning jack 80, having a pair of spaced fluid inlets, is mounted in housing 58 and has a gear shaft 82 extending outwardly therefrom in alignment with spiral gear 78 on clamp shaft 76. A jack gear 84 is rigidly mounted on gear shaft 82 and has spiral gear teeth constructed and arranged to operatively engage the gear teeth on clamp gear 78. Clamp turning jack 80, clamp gear 78, and jack gear 84 are constructed and arranged such that turning jack 80 can be actuated to revolve clamp 60 either clockwise or counterclockwise through a full 360° if necessary.

Where appropriate, the structure of cutting means 22 is similar to the structure of tree holding means 20. For example, cutting means 22 comprises a lower cutter boom 86 pivotally connected at 88 to turntable 26 on carriage 12. Each of a pair of cutter boom lifting jacks 90 and 92 have one end pivotally connected to turntable 26 and the other end pivotally connected to lower cutter boom 86. Cutter boom lifting jacks 90 and 92 can be actuated to raise and lower the lower cutter boom 86 about its pivotal connection 88 in a plane vertical to carriage 12.

A middle cutter boom 94 is slidably enclosed in lower cutter boom 86 with the upper end of middle cutter boom 94 extending beyond the upper end of lower cutter boom 86. A cutter boom slide jack 96 is mounted within the lower end of lower cutter boom 86 and is operatively connected to the lower end of middle cutter boom 94 within lower cutter boom 86. Slide jack 96 can be actuated to move middle cutter boom 94 longitudinally of lower cutter boom 86.

An upper cutter boom 98 has its lower end pivotally connected at 100 to the upper end of middle cutter boom 94. A pair of spaced parallel ears 102 extend upwardly from middle cutter boom 94 near the pivotal connection 100 between upper cutter boom 98 and middle cutter boom 94. Another pair of spaced parallel ears 104 extend upwardly from upper cutter boom 98 in alignment with ears 102 on middle cutter boom 94. A cutter boom bending jack 106 is pivotally connected at its ends to ears 102 and 104 and can be actuated to raise and lower upper cutter boom 98 about the pivotal connection 100 in a plane vertical to carriage 12.

A cutter assembly, indicated generally by reference numeral 108, is pivotally connected at 110 to the upper end of upper cutter boom 98. A pair of spaced parallel ears 112 extend downwardly from cutter assembly 108 in alignment with another pair of spaced parallel ears 114 that extend downwardly from upper cutter boom 98. A cutter boom swing jack 116 is pivotally connected at its ends to ears 112 and 114 and can be actuated to raise and lower cutter assembly 108 about its pivotal connection 110 in a plane perpendicular to carriage 12.

Cutter assembly 108, shown in detail in FIGURE 4, comprises suitable tree cutting apparatus such as a continuous chain saw 118 operatively mounted on a saw body 120 which is mounted on and extends outwardly from a saw housing 122. Chain saw 118 is driven by a sprocket wheel 124 mounted on saw housing 122 and connected to suitable drive means such as hydraulic motor 126 which is also mounted on saw housing 122. Chain saw 118, saw body 120, sprocket wheel 124 and hydraulic motor 126 are all mounted between a mounting plate 128 and a face plate 130. The outer edge of mounting plate 128 is revolvably engaged in channel 132 formed between circumferential flanges 134 and 136 extending inwardly from the inner wall of saw housing 122.

A saw shaft 138 extends outwardly from the side of mounting plate 128 rearwardly within saw housing 122, and a saw gear 140, having spiral gear teeth, is rigidly mounted on saw shaft 138. A saw jack 142, having a pair of spaced fluid ports, is mounted within saw housing 122 and has a gear shaft 144 extending therefrom in alignment with saw shaft 138. A jack gear 146 is rigidly mounted on gear shaft 144 and has spiral gear teeth constructed and arranged for operative engagement with the spiral teeth of saw gear 140. Saw jack 142 can be actuated to revolve the structural elements including chain saw 118 mounted on mounting plate 128 about an axis of revolution passing through the center of saw body 120 and mounting plate 128. Thus chain saw 118 can be revolved either clockwise or counterclockwise through 360°.

Several of the structural elements of the tree harvester machine of this invention have been omitted from the accompanying drawings and from the discussion presented herein for purposes of clarity in describing the concept of this invention. For example, all of the jack assemblies described herein are connected by suitable flexible conduits with receptacle and pumping means for hydraulic fluid used to actuate the jack assemblies. Furthermore, the structural details of control means 18 employed to actuate and control the structural elements described herein are not critical to the concept of this invention and can be readily ascertained and designed by one skilled in the art. In addition, revolution of turntables 24 and 26 can be regulated by suitable control means 148 associated with cab 16 on carriage 12 and can be effected by suitable means that are readily determinable by one skilled in the art, such as a drive shaft driven by motor 14 and extending forwardly under carriage 12 adjacent turntables 24 and 26. The drive shaft can have mounted thereon a plurality of gears adapted for engagement with ring gears or the like mounted on the undersurfaces of turntables 24 and 26 such that the gears on the drive shaft can be moved into and out of engagement separately with the ring gears on turntables 24 and 26 to revolve the turntables separately any desired amount on carriage 12.

In operation, the tree harvester machine is positioned adjacent a standing tree to be harvested. According to one mode of operation of the apparatus of this invention, the standing tree is first topped and delimbed by the extensible and revolvable cutting means employed either independently or in conjunction with the extensible and revolvable tree holding means which can be used to hold and transport the tree top and limbs. Thereafter, the delimbed tree is cut into short lengths by the tree cutting means while the tree holding means is employed in conjunction therewith to hold and transport the short lengths of tree during cutting and loading onto suitable storage or conveyor means associated with the tree harvester machine. According to another mode of operation of the apparatus of this invention, the tree harvester machine is positioned adjacent a standing tree which is first felled by employing in combination the tree holding means and the tree cutting means. After the tree is felled, it is topped and delimbed either on the ground by using the tree cutting means separately, or in an elevated position by employing the tree cutting means and the tree holding means in combination and cooperation. Thereafter, the felled tree is cut into short lengths which are held and transported by the tree holding means during cutting and loading onto suitable storage or conveyor means associated with the tree harvester machine.

The flexibility and adjustability of the cutting means and holding means described herein are illustrated in FIGURES 2 and 3, which show the tree harvester machine with the cutting means and holding means in several different positions and orientations. With respect to FIGURES 2 and 3, it can be seen that the tree harvester machine of this invention can be used to harvest either standing or previously felled trees and can perform all of the tree harvesting operations continuously without repositioning the machine. Furthermore, in instances where the trees are closely spaced, the tree harvester machine of this invention can be used for continuously harvesting a plurality of trees without repositioning the machine. It will be evident also that the tree harvester machine of this invention can be used as a tree cutter or tree loader, if such limited use is desirable.

The tree harvester machine of this invention provides the advantage of combining, in a single machine, separate tree cutting means and tree holding means which are separately revolvable about their individual mountings on the machine. The tree holding means and tree cutting means of this invention are each extensible and each comprise a plurality of independently flexible members, with the tree engaging members; that is, the saw and the clamp, of both the tree holding means and the tree cutting means being independently revolvable on their respective mountings. Such broad flexibility and adjustability in the construction and operation of the tree holding means and the tree cutting means of this invention provides a tree harvesting machine having tree holding means and tree cutting means that are independently and cooperatively operable in virtually any position adjacent the tree being harvested without necessitating repositioning of the harvesting machine itself.

The preceeding detailed description of the structural elements of various embodiments of the tree harvester machine of this invention has been presented herein for purposes of explication according to the provisions of the patent statutes. It is not intended that such description be construed as a limitation of the inventive concept described herein to any extent greater than that inventive concept is limited by the following claims.

I claim:
1. A tree harvester machine comprising,
support means,
tree holding means revolvably mounted on the support means, said tree holding means includes a tree clamp mounted at one end of the tree holding means and revolvable about an axis of revolution passing through the clamp,
tree cutting means revolvably mounted on the support means,
means mounted on the support means and connected to the tree holding means for actuation of the tree holding means,
means mounted on the support means and connected to the tree cutting means for actuation of the tree cutting means,
said tree holding means and tree cutting means being constructed and arranged for operation separately and simultaneously in cooperation with each other.
2. A tree harvester machine as described in claim 1 wherein the tree holding means is extensible and comprising:
means mounted on the support means and connected to the tree holding means for extension and contraction of the tree holding means.
3. A tree harvester machine as described in claim 1 wherein the tree cutting means is extensible and comprising,
means mounted on the support means and connected to the tree cutting means for extension and contraction of the tree cutting means.
4. A tree harvester machine as described in claim 1 having extensible tree holding means and extensible tree cutting means and comprising,
  means mounted on the support means and connected to the tree holding means for extension and contraction of the tree holding means,
  means mounted on the support means and connected to the tree cutting means for extension and contraction of the tree cutting means,
  means mounted on the support means and connected to the tree holding means for revolving the tree holding means on the support means, and
  means mounted on the support means and connected to the tree cutting means for revolving the tree cutting means on the support means.

5. A tree harvester machine as described in claim 1 wherein the tree cutting means comprises,
  a tree saw mounted at one end of the tree cutting means and revolvable about an axis of revolution passing through the tree saw.

6. A tree harvester machine as described in claim 1 wherein the tree holding means comprises,
  a holding means boom assembly,
  a tree clamp assembly pivotally connected to the end of the holding means boom assembly remote from the support means for swinging motion of the tree clamp assembly in a plane vertical to the support means,
  said tree clamp assembly comprising a tree clamp mounted in the tree clamp assembly and revolvable about an axis of revolution passing through the tree clamp.

7. A tree harvester machine as described in claim 1 wherein the tree cutting means comprises,
  a cutting means boom assembly pivotally mounted on the support means for swinging movement in a plane vertical to the support means,
  a cutter assembly pivotally mounted on the end of the cutting means boom assembly remote from the support means for swinging movement of the cutter assembly in a plane vertical to the support means, and
  wherein said cutter assembly comprises a tree cutting member mounted in the cutter assembly and revolvable about an axis of revolution passing through the tree cutting member.

8. A tree harvester machine as described in claim 1 wherein the tree holding means comprises,
  a holding boom assembly mounted on the support means,
  a clamp assembly pivotally connected to the end of the holding boom assembly remote from the support means for swinging movement of the clamp assembly in a plane vertical to the support means,
  said clamp assembly comprising a tree clamp mounted in the clamp assembly and revolvable about an axis of revolution passing through the tree clamp, wherein the tree cutting means comprises,
  a cutter boom assembly mounted on the support means,
  a cutter assembly pivotally connected to the end of the cutter boom assembly remote from the support means for swinging movement of the cutter assembly in a plane vertical to the support means,
  said cutter assembly comprising a tree cutting element mounted in the cutter assembly and revolvable about an axis of revolution passing through the tree cutting element,
  wherein each of the holding boom assembly and the cutter boom assembly comprises a lower boom member pivotally connected to the support means,
  a middle boom member slidable longitudinally within the lower boom member,
  an upper boom member having its lower end pivotally connected to the end of the middle boom member remote from the pivotal connection between the lower boom member and the support means,
  means mounted on the support means and connected to the lower boom member for raising and lowering the lower boom member about its pivotal connection to the suport means in a plane vertical to the support means,
  means mounted within the lower boom member and connected to the middle boom member for movement of the middle boom member longitudinally of the lower boom member,
  means mounted on the middle boom member and connected to the upper boom member for swinging said upper boom member about its pivotal connection to the middle boom member in a plane vertical to the support means, and
  means mounted on the upper boom member and connected to the tree engaging assembly associated therewith for swinging said tree engaging assembly about its pivotal connection to the upper boom member in a plane vertical to the support means.

9. A tree harvester machine as described in claim 1 wherein the tree holding means comprises an extensible and adjustable boom assembly mounted on the support means, and
  a clamp assembly comprising,
  a clamp housing connected to the end of the boom assembly remote from the support means,
  mounting means revolvably secured in the clamp housing,
  a tree clamp rigidly secured to the mounting means for revolution therewith, and
  means mounted in the housing and operatively connected to the mounting means for revolution thereof.

10. A tree harvester machine as described in claim 1 wherein the tree cutting means comprises,
  an extensible and adjustable boom assembly pivotally connected to the support means, and
  a cutter assembly comprising,
  a cutter housing pivotally connected to the end of the boom assembly remote from the support means,
  mounting means revolvably secured in the cutter housing,
  a cutting member rigidly connected to the mounting means for revolution therewith, and
  means mounted in the housing and operatively connected to the mounting means for revolution of the mounting means.

References Cited

UNITED STATES PATENTS 3,323,563  6/1967  Larson _____ 144—3

FOREIGN PATENTS 1,396,731  3/1965  France.

WILLIAM W. DYER, Jr., *Primary Examiner.*

W. D. BRAY, *Assistant Examiner.*